Feb. 24, 1970      E. K. BASHISTA      3,496,923
INTERNAL COMBUSTION ENGINE AND METHOD

Filed March 20, 1968      2 Sheets-Sheet 1

*INVENTOR*
EDWARD K. BASHISTA

BY *Lane, Aitken, Dunner & Ziems*
ATTORNEYS

Feb. 24, 1970     E. K. BASHISTA     3,496,923
INTERNAL COMBUSTION ENGINE AND METHOD
Filed March 20, 1968     2 Sheets-Sheet 2

BEFORE

AFTER

BEFORE

AFTER

INVENTOR
EDWARD K. BASHISTA

BY
*Lane, Aitken, Dunner & Ziems*
ATTORNEYS

United States Patent Office 3,496,923
Patented Feb. 24, 1970

3,496,923
INTERNAL COMBUSTION ENGINE AND METHOD
Edward K. Bashista, 25601 Jackson, Highland Hills 120,
Novi, Mich. 48050
Filed Mar. 20, 1968, Ser. No. 714,681
Int. Cl. F02b 23/00
U.S. Cl. 123—191                    9 Claims

ABSTRACT OF THE DISCLOSURE

This disclosure contains drawings and a description of an improved internal combustion engine, both before and after modification to incorporate the improvement. Essentially, the improvement involves the rounding of all outside corners exposed to the interior of the combustion chamber so that hot spots, tending to cause pre-ignition and/or detonation, are avoided.

Background of the invention

This invention relates to internal combustion engines and more particularly, it concerns a combustion chamber modification for such engines by which improved operation is achieved, as well as a method for making such modifications to a conventionally designed internal combustion engine.

It is widely known that the operating efficiency of all types of internal combustion engines in which a reciprocating piston is moved through its power stroke by the expansion of a burning fuel mixture, is dependent in good measure on the instant at which the fuel mixture is ignited relative to time of piston travel, as well as the manner in which the fuel mixture is burned in the combustion chamber to which the piston is exposed. For example, in a conventional automotive engine of the spark ignition type, it is important that the igniting spark be generated at an instant during the cycle of piston travel so that the maximum thrust of the expanding gases operates against the piston after it reaches top dead center and during its power stroke. It is also important from the standpoint of maximum efficiency in such engines that the fuel mixture within the combustion chamber be ignited from a single point, namely the point of the ignition spark, and spread through the combustion chamber behind a flame front so as to develop a progressive expansion of the burned gases during the power stroke of the piston. In the conventional internal combustion engine, the first of these factors falls broadly under the category of ignition timing and is controlled by synchronizing the development of a spark in each combustion chamber with the movement of the pistons, whereas the second factor is most generally considered a function of the particular fuel mixture employed in conjunction with the compression ratio for a given engine.

In the interest of achieving more accurate synchronization of ignition timing with piston movement, many sophisticated mechanical and electronic systems have been devised. Such systems, however, account only for the controlled generation of the ignition spark and do not in any way account for uncontrolled, self-ignition of the fuel mixture in the combustion chamber as a result of residual heat remaining in the walls or portions of the walls of the combustion chamber. This uncontrolled self-ignition is not uncommon even in the most refined internal combustion engines currently available, and is generally termed "pre-ignition."

As pointed out above, combustion of the fuel mixture in a combustion chamber ideally starts at the ignition spark and spreads uniformly through the combustion chamber behind the flame front. If, however, in addition to this intentional ignition, unburned fuel gases are ignited at some other point remote from the ignition spark, causing a rapid and local increase in pressure at the remote point, a phenomenon called "detonation" occurs. The result of detonation is the development of violent, vibrating pressure waves which evidence themselves as an audible metallic click or knock when these waves strike the walls of the combustion chamber.

Although both internal combustion engine technology and engine fuel technology have advanced to a point where the problems associated with pre-ignition and detonation are reduced, both of these phenomena continue to exist in present day engines. Correspondingly, most currently available internal combustion engines operate at less than peak efficiency and in many instances, fail where either of these phenomena is extreme, not to mention the shortened effective life of an engine as a result of continued less extreme forms of pre-ignition and/or detonation. Also, and because of such reduced efficiency, increased amounts of unburned hydrocarbons are exhausted by these engines, thereby contributing to the problems of air pollution and contamination.

Summary of the invention

In accordance with the present invention, pre-ignition and detonation during the operation of an internal combustion engine within normal operating parameters are substantially eliminated by removing all portions on the interior of the combustion chamber exposed to the fuel mixture and which are likely to become heated by the combustion process to a temperature causing unwanted erratic ignition of the fuel mixture. More particularly, all outside corners formed by the juncture of combustion chamber wall surfaces exposed to the combustible fuel mixture are rounded to the largest practicable radius, preferably not less than 0.015 inch. As a result of actual experience with several automotive internal combustion engines which have been modified in accordance with this invention, substantially all problems associated with pre-ignition and detonation are eliminated and a significant increase in engine efficiency and power is achieved. Although the theory of the invention is not completely understood, it is believed that the line or point-type junctures between internal wall surfaces of the combustion chamber forming outside corners, become heated by the operation of the engine to a temperature well above other surface portions of the combustion walls and to such an extent that ignition temperatures are reached at these outside corners. By rounding these outside corners in accordance with the present invention, it is believed that more effective heat transfer from the juncture of surfaces heretofore forming the corners, is permitted with the result that uncontrolled ignition temperatures within the chamber are not reached.

Among the objects of the present invention are therefore: the provision of an improved combustion chamber for internal combustion engines; the provision of a unique method for modifying conventional internal combustion engines so that the operating efficiency thereof is enhanced; and, the provision of a combustion chamber for piston-type internal combustion engines in which hot spots likely to cause pre-ignition and/or detonation are eliminated by rounding the juncture of all surfaces exposed to the fuel mixture, including those portions of the spark plug exposed on the interior of the combustion chamber. Other objects and further scope of applicability of the present invention will become apparent from the detailed description to follow taken in conjunction with the accompanying drawings.

Detailed description of the preferred embodiment

Figure 1:
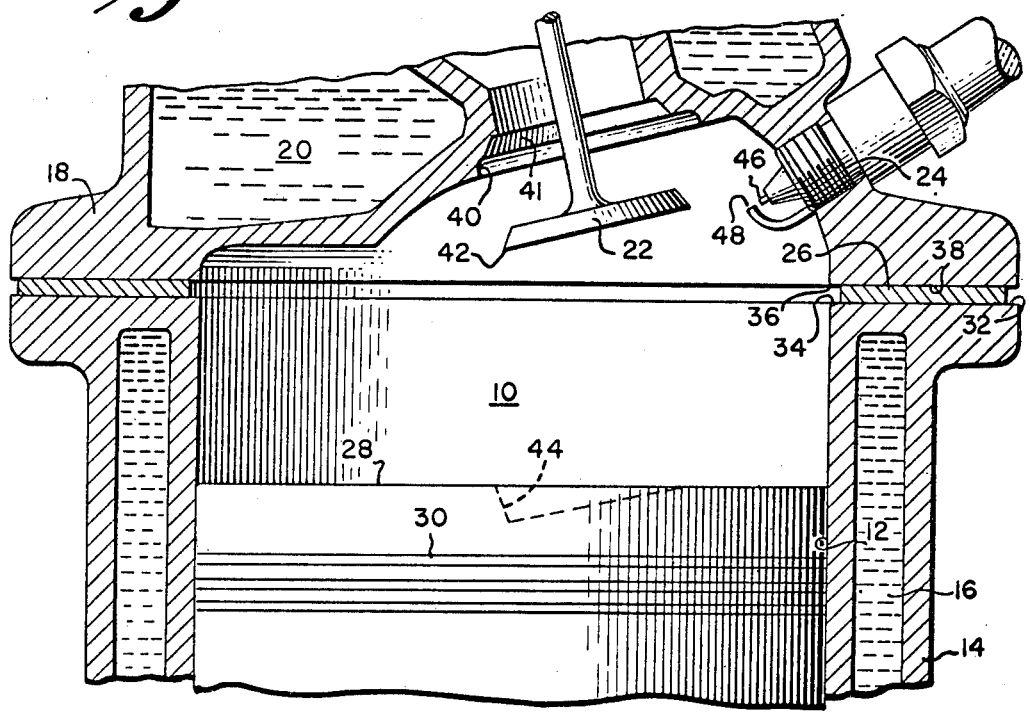
FIG. 1 is a fragmentary cross-section of a combustion chamber of a conventional internal combustion engine before modification in accordance with the present invention.

As shown in FIG. 1, a conventional automotive engine combustion chamber 10 is established by an inner cylindrical surface 12 formed in an engine block 14 having a cooling jacket 16. The chamber 10 is closed at its upper end by a cylinder head 18 having cooling passages 20, a fuel intake valve 22, an exhaust valve (not shown) and a spark plug 24. The cylinder head 18 is fixed to the engine block 14 in conventional fashion by bolts (not shown), the space between the cylinder head 18 and the engine block 14 being sealed by a head gasket 26. A piston 28 having one or more piston rings 30 seals the lower portion of the chamber 10 and is adapted to reciprocate within the cylindrical walls 12 in a manner well known in the art. In the context of the present invention, the chamber 10 is called the combustion chamber in the sense that all surfaces defining this chamber are in contact with the combustible mixture introduced through the intake valve 22 prior to ignition by the spark plug 24. This represents a slight departure from the conventional use of the term which is generally considered that portion of the chamber 10 defined only by the cylinder head 18.

It will be noted that the internal surfaces establishing the combustion chamber 10 define several line junctures which form outside corners exposed to the interior of the combustion chamber. For example, the juncture of the cylindrical surface 12 with the upper plane surface 32 of the engine block defines an outside corner 34, a similar outside corner 36 being formed between the lower surface 38 of the cylinder head 18 and the combustion chamber portion therein. Other such outside corners are established by a valve recess 40, the valve seat 41, valve edges 42, valve accommodation recesses in the upper surface of the piston 28, as well as by the electrodes 46 and 48 of the spark plug 24. Each of these corners are exposed to the fuel mixture introduced into the combustion chamber, which mixture is compressed by upward movement of the piston 28 and ignited by a spark between the electrodes 46 and 48 of the spark plug 24. Such outside corners, it is believed, develop hot spots in the combustion chamber which are likely to cause pre-ignition and the problems associated therewith due to such hot spots reaching a temperature above the ignition temperature of the compressed fuel mixture in the combustion chamber. Also it is believed that detonation is caused by such hot spots by virtue of localized ignition of the compressed fuel mixture at a point remote from the electrodes 46 and 48 of the spark plugs.

Figure 2:
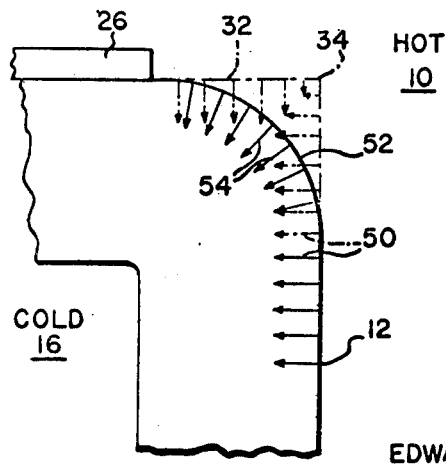
FIG. 2 is an enlarged fragmentary cross-section depicting a theory of heat transfer from one of the outside corners of a combustion chamber like that shown in FIG. 1.

In order to provide one plausible explanation of the reason why the several outside corners exposed to the compressed fuel mixture in the combustion chamber 10 develop hot spots of the type referred to above, reference is made to FIG. 2 of the drawings. In this figure, the corner 34 at the juncture of the cylindrical surface 12 and the plane upper surface 32 of the engine block 14 is greatly magnified. The dashed arrows 50 in FIG. 2 extending from the respective surfaces 12 and 32 are intended to represent by their respective lengths, the rate of heat transfer from the relatively hot combustion chamber 10 to the cooling jacket 16. The rate of heat transfer, therefore, from the surfaces 12 and 32 will be generally uniform with the exception that at the juncture of these surfaces or the outside corner 34, the rate of heat transfer is reduced. As a result, the temperature of the metal or other material at the corner 34 will be elevated relative to the other surfaces 12 and 32. It follows, therefore, that if the overall temperature of the walls within the combustion chamber approach the ignition temperature of the fuel mixture therein, the temperature at the corner 34, being somewhat in excess of the temperature at the surfaces 12 and 32 could exceed the ignition temperature of the fuel. It is believed that these corners actually reach such temperatures in the operation of conventional internal combustion engines and, in effect, provide a continuing glow line or point causing erratic and uncontrolled ignition of the fuel mixture tantamount to pre-ignition and/or detonation and the problems resulting from these phenomena.

In accordance with the invention, each of the outside corners, such as the outside corner 34, is deliberately rounded as depicted by the reference numeral 52 to avoid the extreme concentration of heat or the development of hot spots at the corner 34. Although ideally, the rounded surface portion 52 should be circular on a radius as large as possible, it has been found that in practice that a general rounding to avoid the corner 34 is sufficient. It will be noted that the transfer of heat from the rounded surface 52 as depicted by the arrows 54 is more uniform and less likely to develop a hot spot which would reach temperatures exceeding the ignition temperature of the fuel mixture in the combustion chamber 10.

To form the rounded corner portions, a hand-held abrading tool may be used. It is contemplated, however, that production-type automatic grinding machines could be developed to perform this function at high rates of speed.

Figure 3A:
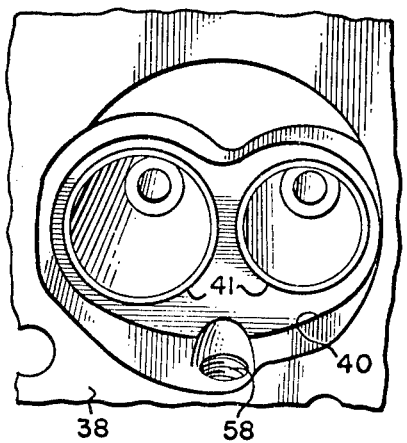
FIGS. 3A and 3B are respectively, plan views of the under side of a conventional engine cylinder head before and after modification in accordance with the present invention; and, FIGS. 4A and 4B are fragmentary perspective views illustrating the components of a standard spark plug exposed within the combustion chamber before and after modification in accordance with this invention, respectively.
Figure 3B:
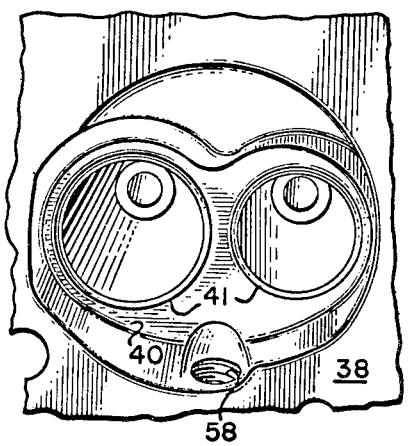

The manner in which the modification of this invention is imparted to the combustion chamber exposed portions of the cylinder head 18 is illustrated in FIGS. 3A and 3B. In FIG. 3A, a conventional cylinder head construction is illustrated prior to modification in accordance with the invention. In FIG. 3B, the same cylinder head combustion chamber portion is shown after modification in accordance with the invention. Thus, it will be noted in FIG. 3B that all outside corners, such as those existing as a result of the valve seat recesses 40 as well as the edges of the valve seat 41 exposed to the combustion chamber interior are rounded in accordance with the description given above and with respect to FIG. 2 of the drawings. Similarly, the portions on the upper surface of the piston 28 which present outside corners of the type described will be rounded in the manner described with respect to FIG. 2.

Figure 4A:
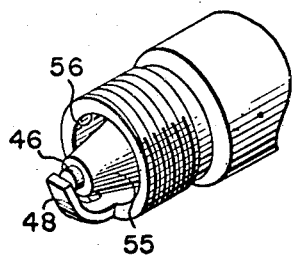
Figure 4B:
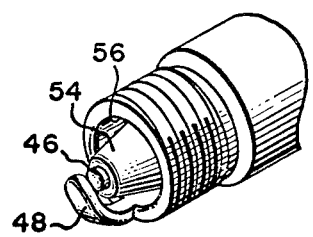

FIG. 4A shows a commercially available spark plug having electrodes 46 and 48, the electrode 46 projecting from an insulator portion 55 whereas the electrode 48 projects directly from a threaded base 56 receivable within an internally threaded spark plug aperture 58 provided in the cylinder head 18. In FIG. 4A, a conventional spark plug is shown prior to modification. In FIG. 4B, the spark plug has been modified in accordance with the present invention so that all external corners on the electrodes 46 and 48 are rounded to the maximum extent practicable to minimize, as much as possible, the development of hot spots on the electrodes which could result in pre-ignition. Similarly, the inner edges of the cylindrical threaded base portion are rounded in the region depicted by the reference numeral 56. Thus, it will be appreciated that all external corners presented on the interior of the combustion chamber and thus exposed to the compressed fuel mixture therein, are rounded so as to avoid any portions which, because of the heat of the normal combustion process, become elevated to a temperature exceeding the ignition temperatures of the fuel mixture.

As a result of actual experience with the present invention, it has been found that the problems ordinarily identified with pre-ignition and detonation are substantially eliminated when the engine is operated within design parameters, that is, with a fuel having a proper octane rating for the compression ratio of the engine and within the speed ranges contemplated by the engine design. Also, it has been found that the ignition timing may be advanced ten or more degrees ahead of the ordinary timing advance conventionally recommended for given engines and engine speeds. Specifically, spark ignition in the range of 15° to 45° before the piston reaches the top dead center position has been found desirable. As a result, greater horsepower and improved operating efficiency results, reflected in reduced throttle settings required for specific output.

The following table gives the result of tests conducted on four recent model automobile engines both before and after modification thereof in accordance with the present invention. These tests were conducted on Clayton Chassis Dynamometer with the horsepower readings taken at the rear wheels of each of the cars.

| Test Engine | Manifold Vacuum (inches Hg) at— | | Peak Power (H.P.) at 4,000 r.p.m. | Spark Advance (degrees before TDC) at— | |
|---|---|---|---|---|---|
| | 50 m.p.h. | 80 m.p.h. | | Initial | 4,000 r.p.m. |
| (1) Before | 18 | 12 | 120 | 6 | 23 |
| After | 19.5 | 15.0 | 140 | 16 | 33 |
| (2) Before | 18.5 | 13 | 82 | 5 | 32 |
| After | 18.5 | 13.5 | 105 | 15 | 43 |
| (3) Before | 17 | 13 | 132 | 6 | 27 |
| After | 18.5 | 14 | 144 | 25 | 45 |
| (4) Before | 17.5 | 12.5 | 82 | 6 | 26 |
| After | 18 | 13 | 102 | 15 | 42 |

It will be appreciated from the above table that a significant increase in horsepower obtains in engines which have been modified in accordance with the present invention. Also it will be noted that because of the avoidance or minimizing of erratic or uncontrolled ignition of the fuel mixture as a result of pre-ignition and/or detonation, the time of the spark ignition may be advanced significantly ahead of recommended timing for conventional engines. As a result, the length of time available for the ignition, burning and expansion of gases within the combustion chamber is increased to a point where substantially complete combustion of the fuel mixture is possible. This factor not only contributes to efficient operation of the engine but also is believed to reduce the amount of unburned hydrocarbons that ordinarily are discharged from the combustion chamber during the exhaust stroke of the piston. In addition, other exhaust contaminants such as carbon monoxide are reduced significantly as a result of the application of this invention to a conventional automotive internal combustion engine. This factor is also attributed to a more complete combustion of the fuel mixture as a result of a substantial elimination of pre-ignition and/or detonation.

Thus it will be appreciated that by this invention, an extremely simple and yet highly effective method of modifying the combustion chamber of an internal combustion engine is provided. Moreover, after having been modified in accordance with the invention, the resulting engine is a significant improvement over engines of the same type before modification.

What is claimed is:

1. An internal combustion engine comprising: means defining at least one combustion chamber into which a combustible fuel mixture is introduced and ignited sequentially to develop synchronized power strokes, said means having internal surface portions which contact the combustible fuel mixture, said surfaces meeting at outside corners exposed to said chamber, each of said outside corners being rounded, thereby to minimize the concentration at said outside corners of heat tending to cause erratic ignition of the combustible fuel mixture introduced into said chamber.

2. The apparatus recited in claim 1 in which said corners are rounded to a radius of at least 0.015 inch.

3. In an internal combustion engine having at least one combustion chamber to receive a combustible fuel mixture which, upon ignition, burns and expands to advance a piston through a power stroke, said combustion chamber being defined by internal surfaces in material having limited heat conducting characteristics and thus tending to retain some residual heat of combustion, the improvement comprising: the provision of rounded surface portions at the junctures of said surfaces which form external corners exposed to the combustible fuel mixture introduced into said combustion chamber, whereby the transfer of heat from said surfaces including the rounded external corner portions is rendered sufficiently uniform as to avoid the development of hot spots likely to cause pre-ignition or detonation of the combustible fuel mixture.

4. The apparatus recited in claim 3 including a spark plug having electrodes exposed to the interior of the combustion chamber, said electrodes also having rounded surface portions at the juncture of the respective surfaces defining the electrodes.

5. The apparatus recited in claim 4 wherein the spark plug has, in addition to said electrodes, a base structure presenting external corners to the interior of the combustion chamber, said external corners on the base of said spark plug also being rounded.

6. The apparatus recited in claim 3 wherein said rounded surface portions have a radius of at least 0.015 inch.

7. The method of improving the operation efficiency of a reciprocating piston-type internal combustion engine having at least one combustion chamber into which a combustible fuel mixture is introduced and ignited to develop synchronized power strokes in the piston, the combustion chamber being formed of material having internal surface portions which contact the combustible fuel mixture and which meet at outside corners exposed to the interior of the chamber, said method comprising the step of: removing a portion of the material at each of said external corners to provide a rounded surface portion at such corners, thereby to minimize the concentration of heat tending to cause erratic ignition of the combustible fuel mixture introduced into the said chamber.

8. The method recited in claim 7 including further the step of advancing the ignition timing of the engine so that combustible fuel mixture is ignited in the range of 15 to 45 degrees before the top dead center position of the piston.

9. The method recited in claim 7 wherein said rounded portions are formed by abrading the external corners of said material to a radius of at least 0.015 inch.

References Cited

UNITED STATES PATENTS 1,840,610   1/1932   Staley et al.   123—191
1,861,045   5/1932   Berry   123—191
2,107,389   2/1938   Price et al.

WENDELL E. BURNS, Primary Examiner

U.S. Cl. X.R.

123—146.5